United States Patent [19]

Hatagishi et al.

[11] Patent Number: 5,252,089
[45] Date of Patent: Oct. 12, 1993

[54] CONNECTOR APPARATUS

[75] Inventors: Yuji Hatagishi; Tetsuaki Suzuki, both of Haibara, Japan

[73] Assignee: Yazaki Corporation, Tokyo, Japan

[21] Appl. No.: 756,689

[22] Filed: Sep. 9, 1991

Related U.S. Application Data

[62] Division of Ser. No. 629,962, Dec. 19, 1990, Pat. No. 5,104,333.

[30] Foreign Application Priority Data

Dec. 20, 1989 [JP] Japan .................................. 1-145919
Jan. 30, 1990 [JP] Japan .................................... 2-7088

[51] Int. Cl.$^5$ ............................................ H01R 13/62
[52] U.S. Cl. .................................... 439/310; 439/342; 439/378; 403/405.1
[58] Field of Search ............... 439/135, 342, 376, 378, 439/345, 347, 373, 529, 544-548, 559, 310, 314, 316; 285/314, 305; 403/13, 14, 405.1, 409.1

[56] References Cited

U.S. PATENT DOCUMENTS

| | | |
|---|---|---|
| 2,998,588 | 8/1961 | Chamberlain et al. |
| 3,392,245 | 7/1968 | Asick et al. ........................... 200/16 |
| 3,750,087 | 7/1973 | Vetter . |
| 4,332,432 | 6/1982 | Colleran . |
| 4,586,771 | 5/1986 | Kraemer et al. . |
| 4,850,890 | 7/1989 | Kuzano et al. ................. 439/314 X |
| 4,883,429 | 11/1989 | Suzuki et al. ......................... 439/74 |

FOREIGN PATENT DOCUMENTS

| | | |
|---|---|---|
| 50-15311 | 6/1975 | Japan . |
| 55-13396 | 4/1980 | Japan . |
| 61-203581 | 9/1986 | Japan . |
| 1442837 | 7/1976 | United Kingdom . |

Primary Examiner—Larry I. Schwartz
Assistant Examiner—Khiem Nguyen
Attorney, Agent, or Firm—Armstrong, Westerman, Hattori, McLeland & Naughton

[57] ABSTRACT

A connector apparatus which assures sufficient fitting of a pair of connectors with each other. The connector apparatus includes a pair of connectors, and a fixing frame having a through-hole defined by a pair of side walls thereof along which the connectors are movable in a fitting direction and in a direction perpendicular to the fitting direction. A guide mechanism including pins on each of the connectors and pin receiving guideways in the fixing frame guides the connectors after the connectors are inserted into the through-hole of the fixing frame from the opposite ends toward each other until they are partially fitted with each other and then causes the connectors to gradually approach and fit together until a thoroughly fitted condition is reached.

1 Claim, 10 Drawing Sheets

CONNECTOR APPARATUS

This is a division of application Ser. No. 629,962 filed Dec. 19, 1990 now U.S. Pat. No. 5,104,333.

BACKGROUND OF THE INVENTION

1. Field of the Invention

This invention relates to a connector apparatus of the type wherein a pair of connectors are removably connected to each other in a through-hole of a partition wall member such as a panel of an automobile or the like.

2. Description of the Prior Art

A connector apparatus of the type wherein a pair of connectors are removably connected to each other in a through-hole of a partition wall member is already known and often employed in an automobile or the like. An exemplary one of such conventional connector apparatus is shown in FIG. 9.

Figure 9:
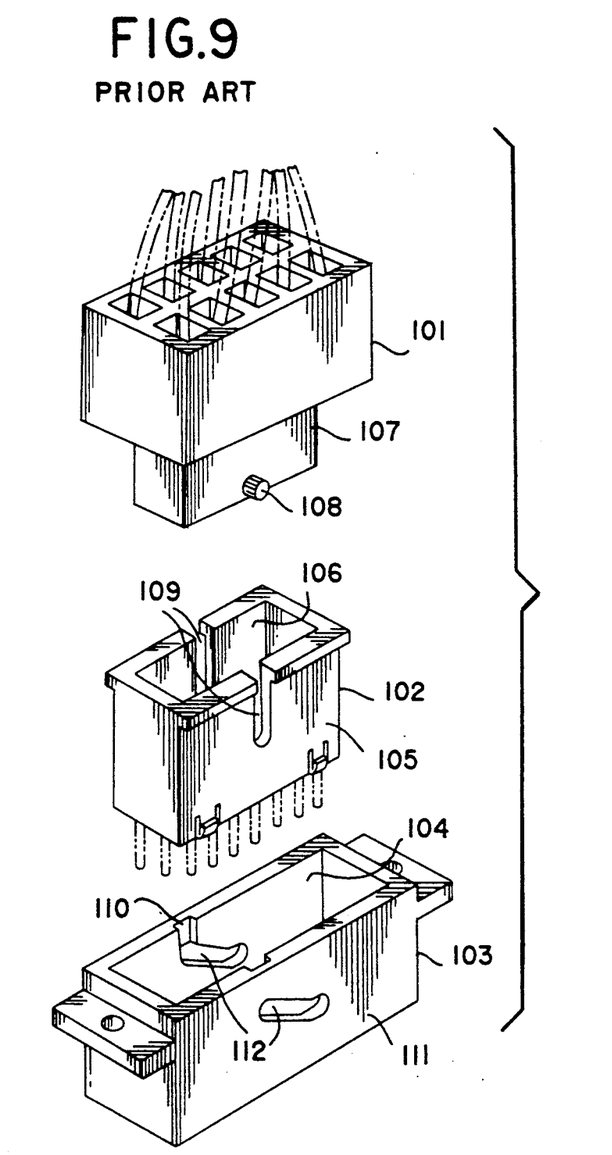
FIG. 9 is a fragmentary perspective view showing a conventional connector apparatus.

Referring to FIG. 9, the connector apparatus shown includes a male connector 101 and a female connector 102 adapted to be fitted with and removed from each other in a first direction, i.e., in a vertical direction in FIG. 9, and a fixing frame member 103 having a rectangular through-hole 104 formed therein for engaging with outer faces of a pair of opposing side walls 105 of the female connector 102 to guide lateral movement of the female connector 102 in a second direction perpendicular to the first direction. Also the female connector 102 has a rectangular through-hole 106 formed therein for engaging with a pair of opposing faces 107 of the male connector 101 to guide movement of the male connector 101 in the second direction.

The male connector 101 has a pair of projections or pins 108 formed on the side faces 107 thereof while the female connector 102 has a pair of vertical slots 109 formed in the side walls 105 thereof such that they extend in the first direction from the top ends of the side walls 105 and receive therein the pins 108 of the male connector 101 when the male and female connectors 101 and 102 are fitted thoroughly with each other. The fixing frame member 103 has a pair of introducing grooves 110 formed on the inner sides of a pair of side walls 111 thereof for guiding the projections 108 of the male connector 101, and a pair of inclined slots 112 formed contiguously to the introducing grooves 110 and obliquely to the first and second directions in the side walls 111 for receiving therein the projections 108 when the male and female connectors 101 and 102 are fitted thoroughly with each other.

Figure 10A:
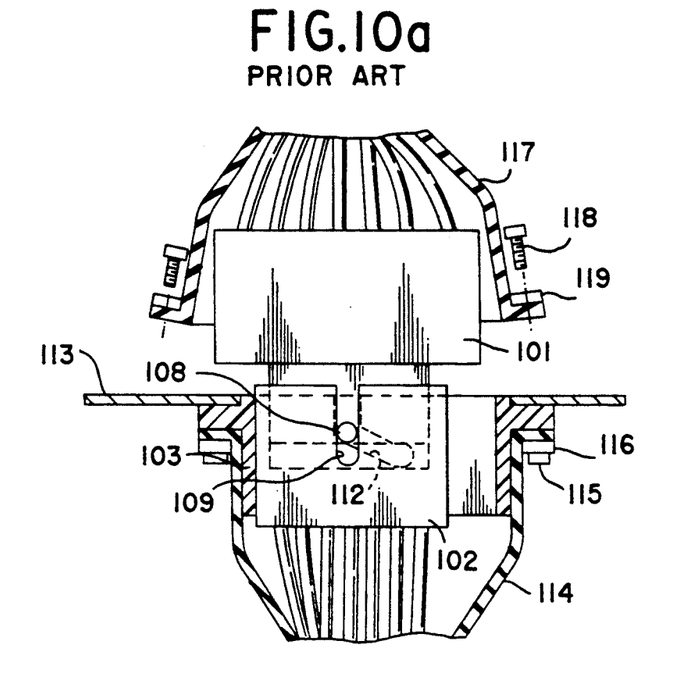
FIGS. 10a and 10b are sectional views showing different stages of a process of coupling a pair of connectors of the connector apparatus of FIG. 9.

Referring now to FIGS. 10a and 10b, the connector apparatus is secured, for example, to a panel 113 of an automobile or the like in the following manner. The female connector 102 is first fitted into the through-hole 104 of the fixing frame member 103 from above in FIG. 9. In the thus fitted condition, the female connector 102 can be moved in the second direction. Then, the fixing frame member 103 is secured to the panel 113 together with a grommet 114 by means of a plurality of bolts 115 and metal elements 116. In this condition, the male connector 101 is inserted into the through-hole 106 of the female connector 102 with the projections 108 thereof received into the slots 109 of the female connector 102 and and also into the introducing grooves 110 of the fixing frame member 103 until the projections 108 come to ends of the inclined slots 112 adjacent the introducing grooves 110 as seen in FIG. 10a.

Figure 10B:
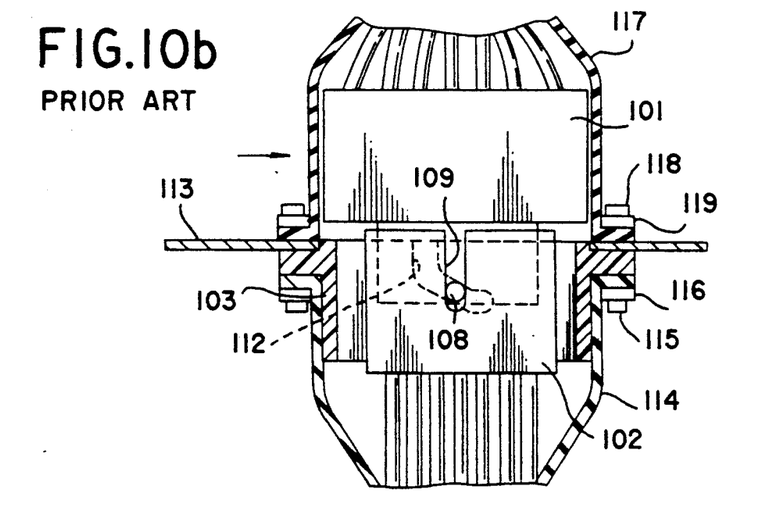

Then, the male connector 101 is moved in the second direction, that is, in the rightward direction indicated by an arrow mark in FIG. 10b. Thereupon, the pins 108 are guided by the inclined slots 112 of the fixing frame member 103 so that the male connector 101 is moved also in the first direction and gradually fitted with the female connector 102. After such movement of the male connector 101, a grommet 117 is secured by means of bolts 118 and metal elements 119, thereby completing the fixation of the connector apparatus.

In this instance, even if leading-in of the male connector 101 is insufficient and built-in metal elements of the male and female connectors 101 and 102 do not contact thoroughly with each other, the grommet 117 can be fastened to the panel 113 by means such bolts 118 as seen in FIG. 10b. Consequently, even after completion of fixation of the connector apparatus, the metal elements of the male and female connectors 101 and 102 remain in an incompletely contacting condition with each other, which will cause an error of an electric circuit element connected to the connector apparatus.

On the other hand, the connector apparatus is advantageous in that the male and female connectors 101 and 102 can be operated perpendicularly to the first or connector fitting direction to fit or remove them with or from each other even where the spacing for the installation of the connectors 101 and 102 on the panel 113 is so limited in the first or connector fitting direction, that is, in a direction perpendicular to the plane of the panel 113, that it is difficult to perform a fitting or removing operation of the connectors 101 and 102. However, since the side walls 105 of the female connector 102 and the side walls 111 of the fixing frame member 103 are overlapped with each other, the connector apparatus has a comparatively great size in the overlapping direction of the side walls 105 and 111.

SUMMARY OF THE INVENTION

It is an object of the present invention to provide a connector apparatus which assures sufficient fitting of a pair of connectors with each other.

It is another object of the present invention to provide a connector apparatus which has a comparatively small size in a lateral direction.

In order to attain the objects, according to one aspect of the present invention, there is provided a connector apparatus, which comprises first and second connectors which are coupled to each other when moved toward each other, a fixing frame capable of being fixedly received in a perforation of a panel or the like and having a through-hole formed therein for receiving the first and second connectors for movement therein, the through-hole being defined by a pair of opposing side walls of the fixing frame along which the first and second connectors are movable in a first direction in which the first and second connectors are fitted with or removed from each other and in a second direction perpendicular to the first direction, guiding means for guiding, when the first connector is moved in the second direction to a predetermined position together with the second connector after the first and second connectors are inserted into the through-hole of the fixing frame from the opposite ends in the first direction toward each other until they are partially fitted with each other, the first and second connectors to cause the first connector to gradually approach and fit with the second connector until a thoroughly fitted condition is reached, a flexible grommet for covering the first connector, and a fixing metal element for fixing the flexible grommet to a panel or the like to which the fixing frame is secured, the flexible grommet being deformed, when the first connector is not at the predetermined position, by the first connector to disable the fixing metal element to be fixed to the panel.

With the connector apparatus, the fixing metal element for the flexible grommet can be secured only when the first connector is at the predetermined position at which the first connector is thoroughly fitted with the second connector. Consequently, incomplete fitting of the first and second connectors can be found out readily, and accordingly, thorough contact of contact elements of the first and second connectors with each other is assured readily.

Accprding to another aspect of the present invention, there is provided a connector apparatus, which comprises first and second connectors which are coupled to each other when moved toward each other, a fixing frame having a through-hole formed therein for receiving the first and second connectors for movement therein, the through-hole being defined by a pair of opposing side walls of the fixing frame along which the first and second connectors are movable in a first direction in which the first and second connectors are fitted with or removed from each other and in a second direction perpendicular to the first direction, the first and second connectors having a substantially same dimension in a direction perpendicular to the first and second directions, one of the first and second connectors having an engaging rod portion while the other has an engaging recess formed thereon for engaging with the engaging rod portion, and guiding means for guiding, when the first connector is moved in the second direction together with the second connector after the first and second connectors are inserted into the through-hole of the fixing frame from the opposite ends in the first direction toward each other until the engaging rod portion is engaged with the engaging recess, the first and second connectors to cause the first connector to gradually approach and fit with the second connector.

With the connector apparatus, since the first and second connectors have a substantially same dimension in the direction perpendicular to the first and second directions and hence are not overlapped with each other in such direction, the overall dimension of the connector apparatus in such direction can be reduced, and accordingly, the connector apparatus can be made compact.

The above and other objects, features and advantages of the present invention will become apparent from the following description and the appended claims, taken in conjunction with the accompanying drawings.

DESCRIPTION OF THE PREFERRED EMBODIMENTS

Figure 1:
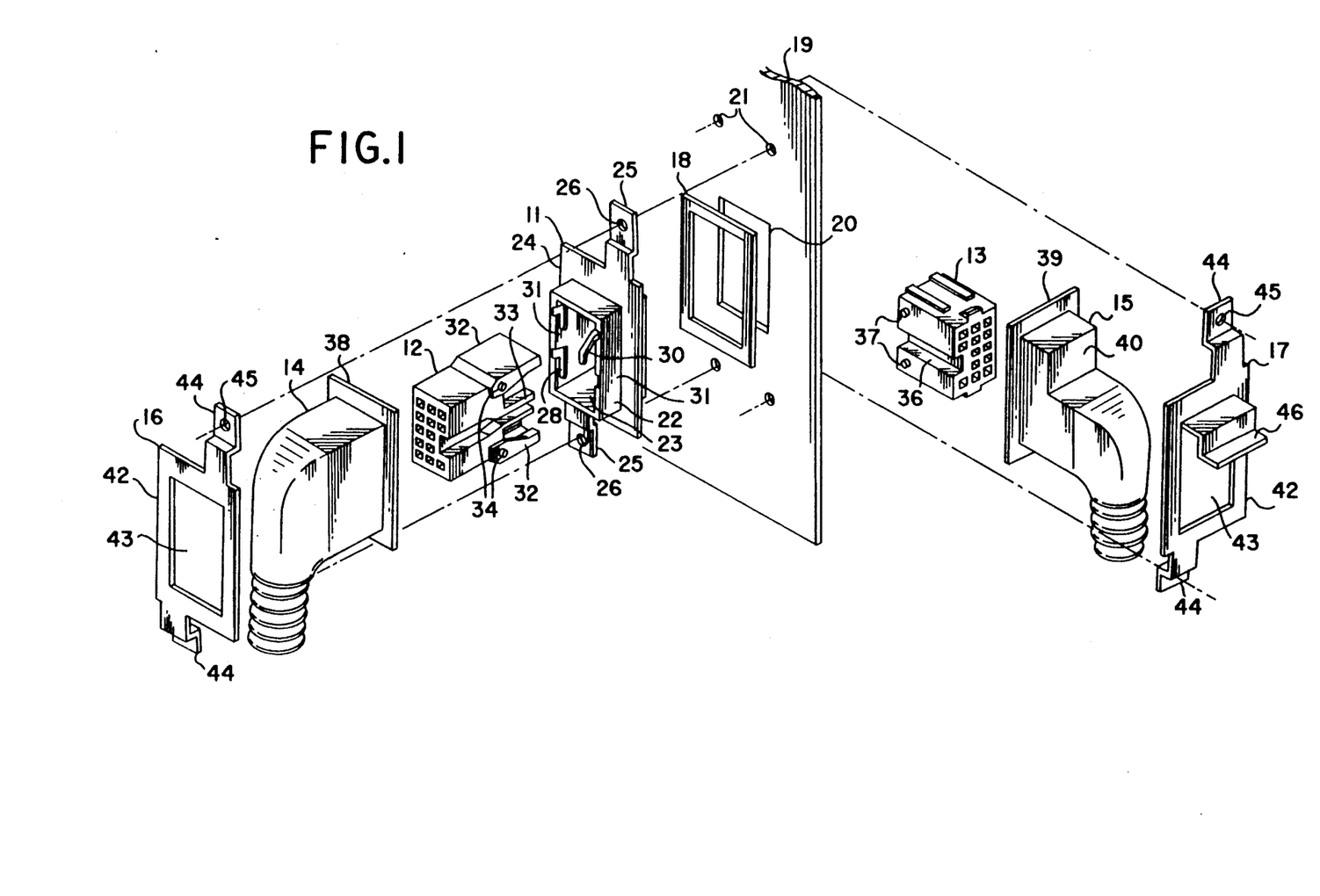
FIG. 1 is a fragmentary perspective view of a connector apparatus showing a first embodiment of the present invention.

Referring first to FIG. 1, there is shown a connector apparatus according to a first embodiment of the present invention. The connector apparatus shown generally includes a fixing frame member 11, a female connector 12, a male connector 13, a pair of grommets 14 and 15, a pair of grommet fixing metal elements 16 and 17, and a packing 18.

The connector apparatus is secured to a panel 19 of an automobile or the like which has a rectangular perforation 20 and a plurality of mounting holes 21 formed therein.

The fixing frame member 11 has a main portion 22 having a rectangular through-hole 23 formed therein, and a rectangular mounting plate portion 24 formed at an axial intermediate portion of and extending outwardly from and perpendicularly to the main portion 22 like a flange. The mounting plate portion 24 of the fixing frame member 11 has a pair of mounting tabs 25 formed at the opposite ends thereof, and a mounting hole 26 is formed in each of the mounting tabs 25.

Figure 2:
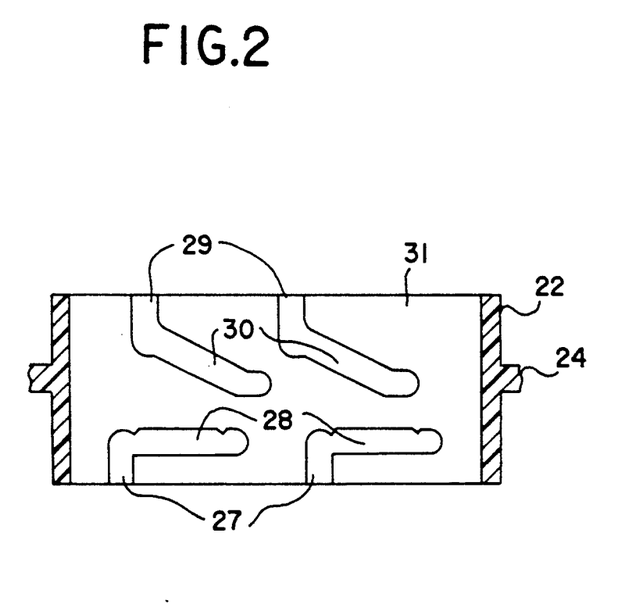
FIG. 2 is an enlarged sectional view of a fixing frame member of the connector apparatus of FIG. 1.

Referring also to FIG. 2, the main portion 22 of the fixing frame member 11 has a pair of guideways or introducing grooves 27 and contiguous connector guiding supporting grooves 28 and another pair of guideways or introducing grooves 29 and contiguous connector guiding supporting grooves 30 formed on the inner side of each of an opposing pair of side walls 31 thereof. The introducing grooves 27 extend upwardly from the bottom end of FIG. 2 of each of the side walls 31, and the connector guiding supporting grooves 28 extend perpendicularly rightwardly in FIG. 2 from the top ends of the introducing grooves 27. Meanwhile, the introducing grooves 29 extend downwardly from the top end in FIG. 2 of each of the side walls 31, and the connector guiding supporting grooves 30 extend obliquely perpendicularly rightwardly in FIG. 2 from the bottom ends of the introducing grooves 30.

Referring back to FIG. 1, the female connector 12 has a pair of receiving plates 32 at a front portion thereof and further has an engaging rod portion 33 between the receiving plates 32. The female connector 12 further has a pair of engaging pins 34 provided on each of the opposite side surfaces thereof.

The male connector 13 has an engaging groove 36 formed on a side face thereof for receiving the engaging rod portion 33 of the female connector 12. The male connector 13 further has a pair of engaging pins 37 provided on each of a pair of opposite side surfaces thereof.

The grommet 14 has a fixing flange 38 on an outer periphery of a terminal end thereof while the grommet 15 has a fixing flange 39 on an outer periphery of a terminal end thereof. The grommet 15 further has an engaging step portion 40 at an intermediate portion thereof.

Each of the fixing metal elements 16 and 17 has a holding frame portion 42 having a rectangular hole 43 formed therein and a pair of mounting tabs 44 formed on the opposite ends thereof. Each of the mounting tabs 44 has a mounting hole 45 formed therein. The fixing metal element 17 further has a holding plate portion 46 formed on an edge thereof adjacent the hole 43 for engaging with the engaging step portion 40 of the grommet 15.

Figure 3A:
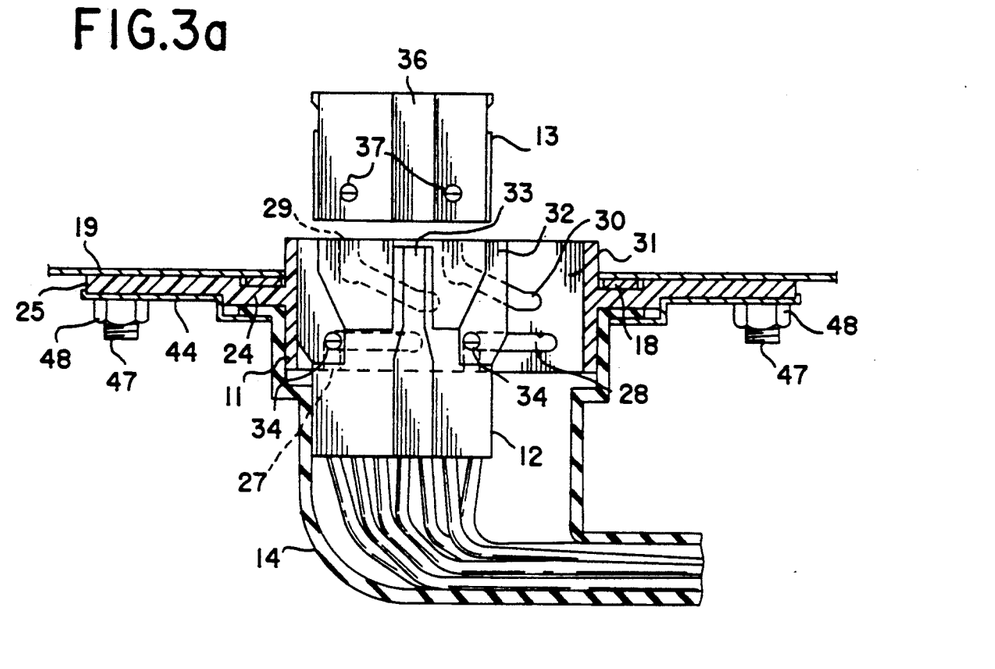
FIGS. 3a, 3b, 3c and 3d are sectional views showing different stages of a procedure of coupling a pair of connectors of the connector apparatus of FIG. 1.

The connector apparatus is secured to the panel 19 in the following manner. In particular, the female connector 12 is inserted into the rectangular through-hole 23 of the fixing frame member 11 until the engaging pins 34 of the female connector 12 are positioned to the upper ends in FIG. 3a of the introducing grooves 27, and then the grommet 14 is fitted onto an outer periphery of the fixing frame member 11. Then, the fixing metal element 16 is overlapped with the fixing frame member 11, and the fixing frame member 11 is placed on one face of the panel 19 with an upper portion in FIG. 3 of the main portion 22 thereof fitted in the rectangular perforation 20 of the panel 19. Then, a pair of bolts 47 are passed through the mounting holes 21, 26 and 45 of the panel 19, fixing frame member 11 and fixing metal element 16, and nuts 48 are screwed onto the bolts 47 to fasten the fixing frame member 11, female connector 12 and grommet 14 to the panel 19 with the packing F interposed between the fixing frame member 11 and the panel 19.

Figure 3B:
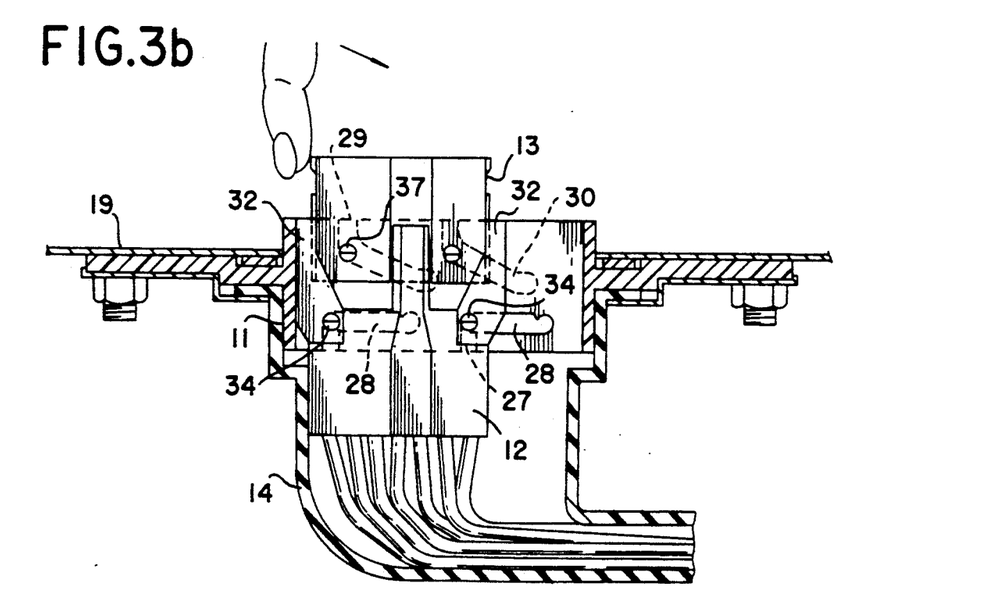
Figure 3C:
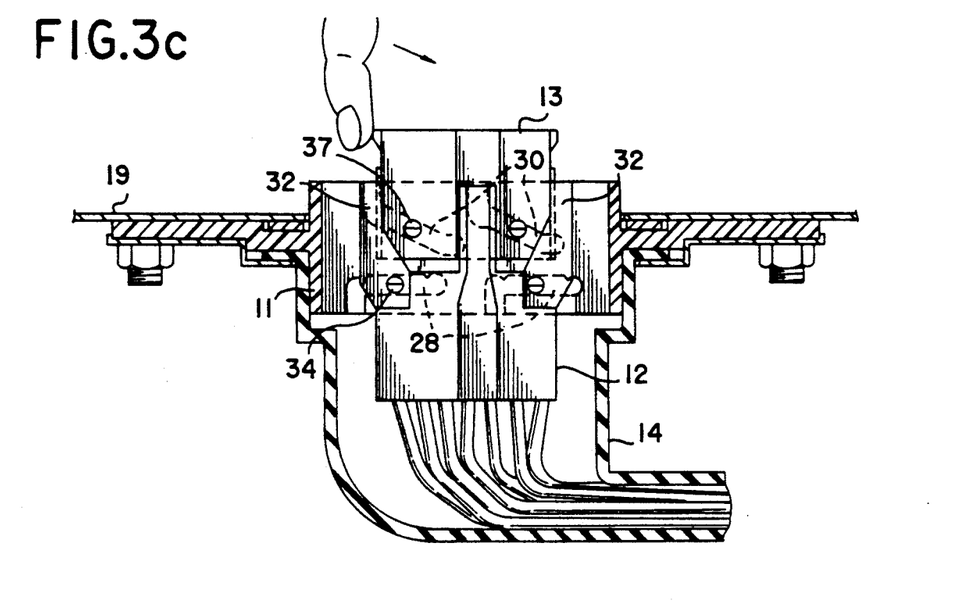

Then, the male connector 13 is fitted into the rectangular through-hole 23 of the fixing frame member 11 and between the receiving plates 32 of the female connector 12 from the opposite side of the female connector 12 with respect to the panel 19, that is, from above in FIG. 3 until the engaging pins 37 thereon are positioned to the bottom ends of the the introducing grooves 29 as seen in FIG. 3b. Thereupon, the engaging rod portion 33 of the female connector 12 is partially inserted into the engaging recessed portion 33 of the male connector 13 as seen in FIG. 3b.

Figure 3D:
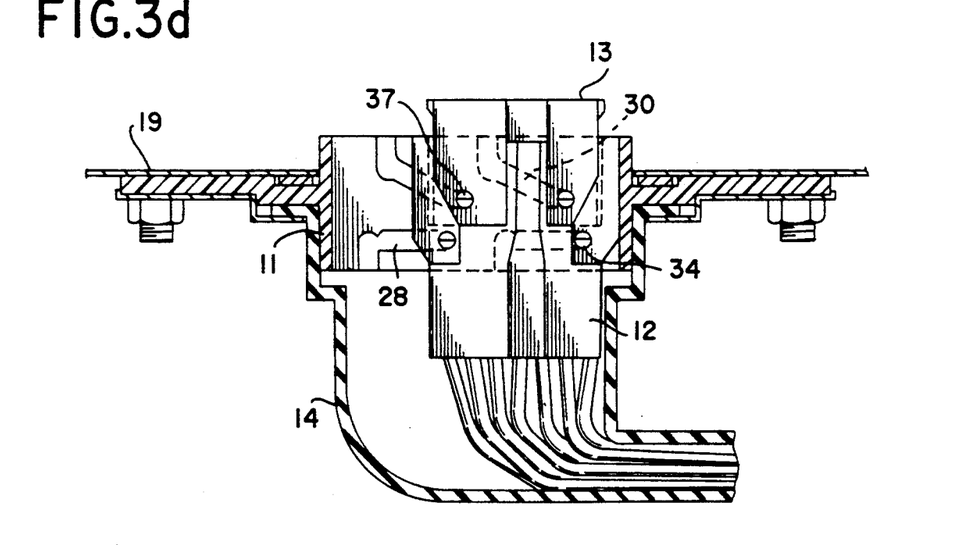

Subsequently, the male connector 13 is manually operated to move rightwardly as indicated by an arrow mark in FIG. 3b, that is, in a downward inclined direction relative to the connector fitting direction in which the female and male connectors 12 and 13 are to be fitted with each other. Upon such rightward movement of the male connector 13, the female connector 12 is moved in the same direction by the male connector 13 by way of the receiving plates 32 of the female connector 12 and through engagement between the engaging groove 36 and the engaging rod portion 33. During such movement of the male connector 13, it is moved also in the downward direction in FIGS. 3b or 3c toward the female connector 12 by a guiding action of the oblique connector guiding supporting grooves 30 to cause built-in terminal metal elements (not shown) of the male and female connectors 13 and 12 to be contacted with each other as seen from FIG. 3c. When the engaging pins 34 and 37 on the female and male connectors 12 and 13 come to terminal ends of the connector guiding supporting grooves 28 and 30, respectively, the female and male connectors 12 and 13 are fitted thoroughly with each other as seen in FIG. 3d.

Figure 4:
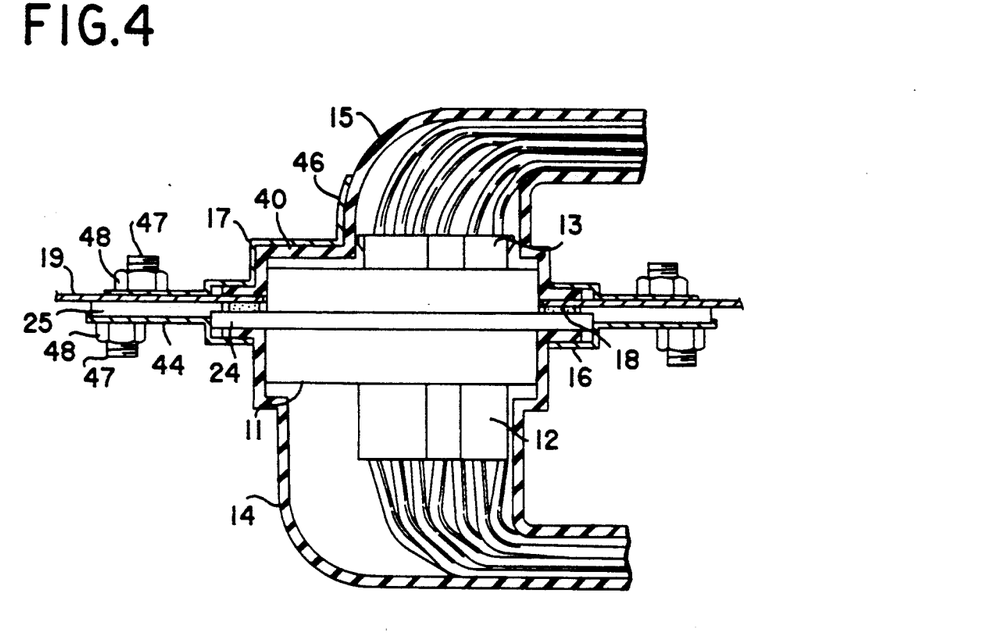
FIG. 4 is a sectional view showing the connector apparatus of FIG. 1 in a thoroughly coupled condition.

After then, the grommet 15 is fitted onto the male connector 13, and then the fixing plate 17 is secured to the panel 16 by means of another pair of bolts 47 and nuts 48 thereby to secure the grommet 15 to the panel 19 as seen in FIG. 4.

When the female and male connectors 12 and 13 are fitted thoroughly with each other as seen in FIG. 4 after such transverse movement of the male connector 13 as described above, they are positioned at their limit positions in the rightward direction in FIG. 4. When the female and male connectors 12 and 13 are at the rightward limit positions, they will not interfere with the engaging step portion 40 of the grommet 15. Therefore, when the grommet 15 is moved toward the panel 19, the engaging step portion 40 thereof is free from the male connector 13 and thus maintains, after the grommet 15 is received on the panel 19, its original shape as seen in FIG. 4. Accordingly, when the fixing metal element 17 is moved subsequently toward the panel 19, it can be advanced until it is contacted with the panel 19 and the holding plate portion 46 thereof is contacted with the engaging step portion 40 of the grommet 15 as seen in FIG. 4. Consequently, the grommet 15 can be secured in position on the panel 19 by way of the fixing metal element 17.

Figure 5:
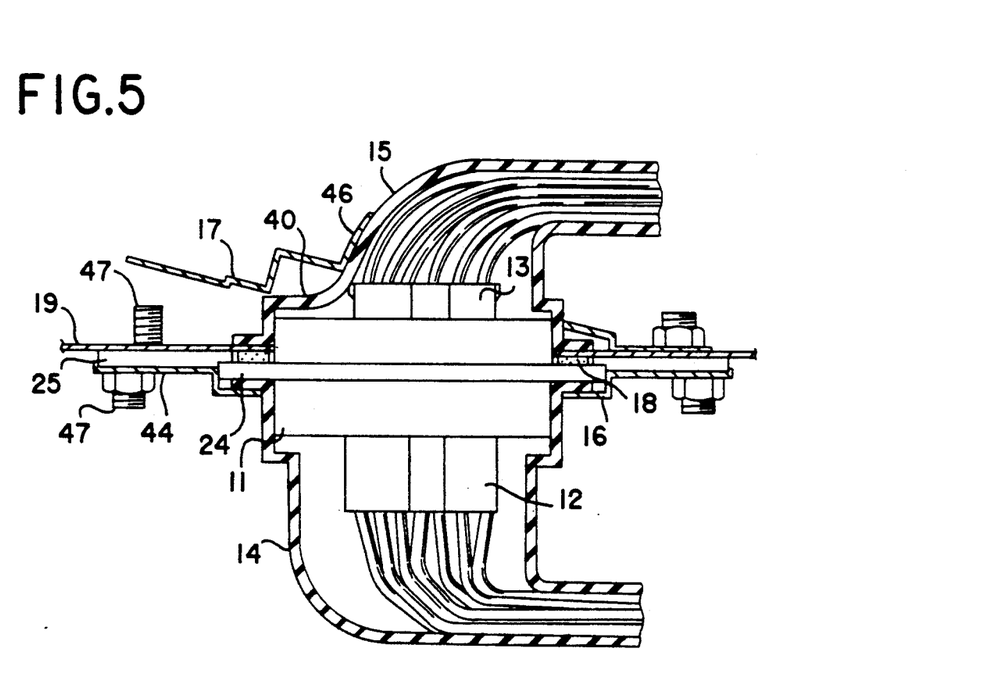
FIG. 5 is a similar view but showing the connector apparatus of FIG. 1 in an incompletely coupled condition.

On the other hand, if the female and male connectors 12 and 13 are not thoroughly fitted with each other after the transverse movement of the male connector 13 described above, then they are not in such rightward limit positions, and consequently, if it is attempted to move the grommet 15 toward the panel 19, then the engaging step portion 40 of the grommet 15 is engaged with and resiliently deformed by a left top portion in FIG. 5 of the male connector 13 as seen in FIG. 5. Consequently, even if it is attempted to subsequently move the fixing metal element 17 toward the panel 19 to secure the grommet 15 to the panel 19, the holding plate portion 46 of the fixing metal element 17 is engaged with the thus deformed engaging step portion 40 of the grommet 15, and accordingly, the fixing metal element 17 cannot be moved nor secured to the panel 19 as seen from FIG. 5.

Figure 6:
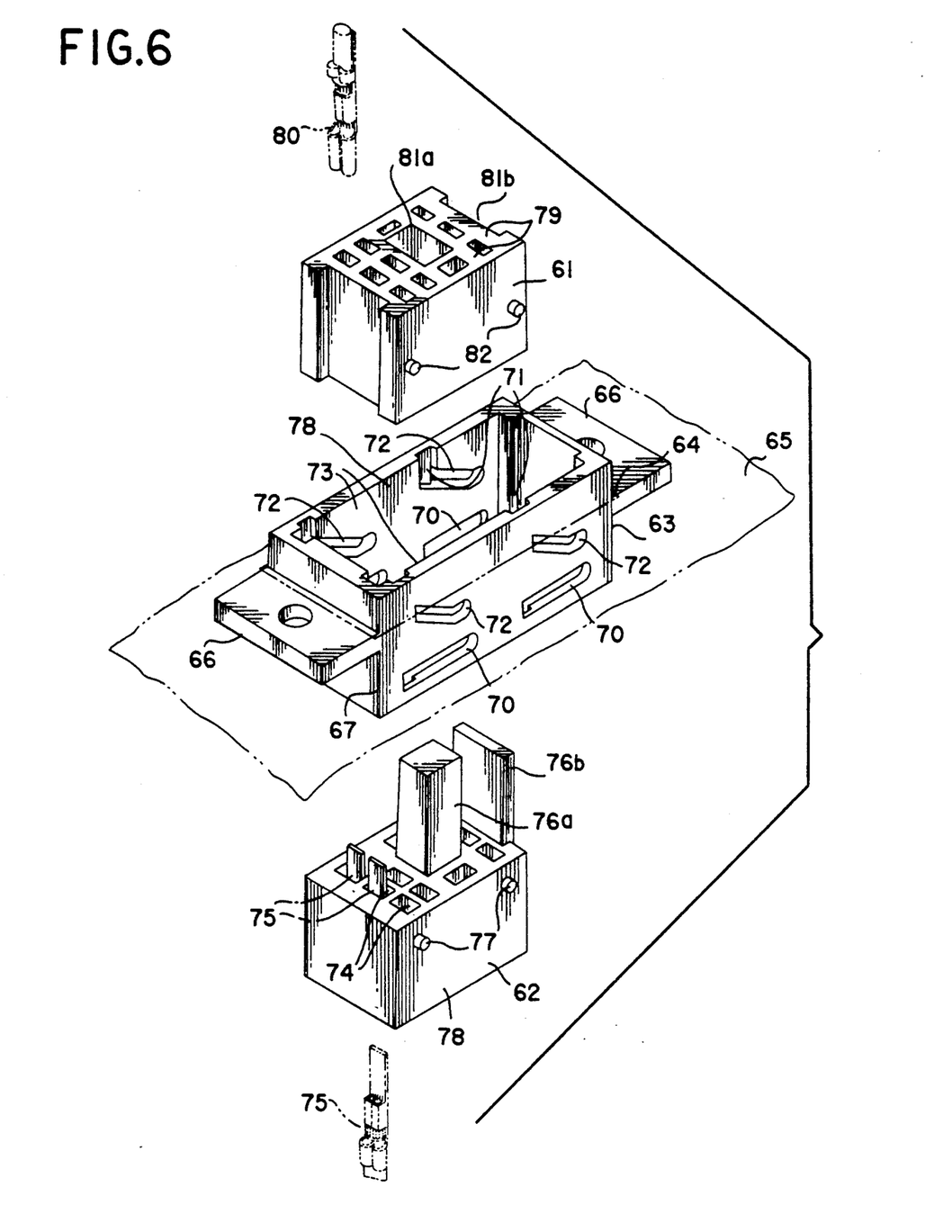
FIG. 6 is a fragmentary perspective view of another connector apparatus showing a second embodiment of the present invention.

Referring now to FIG. 6, there is shown a connector apparatus according to a second embodiment of the present invention. The connector apparatus shown includes an active connector 61, a passive connector 62, and a fixing frame member 63. The fixing frame member 63 is fitted in a rectangular hole 64 formed in a panel 65 of an automobile or the like and is secured, at a pair of flanges 66 formed at the opposite ends of a main portion 67 thereof, to the panel 65 by means of a plurality of bolts and nuts not shown.

Figure 7A:
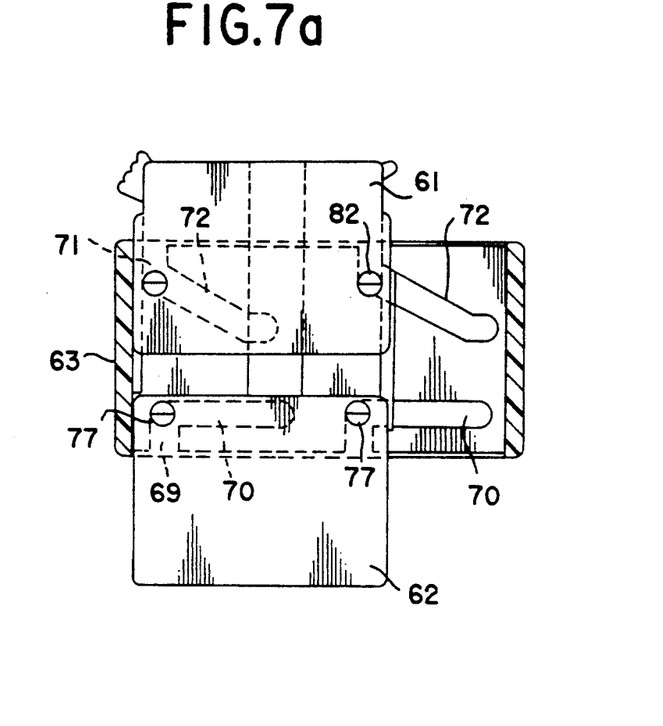
FIGS. 7a and 7b are enlarged sectional views showing different stages of a procedure of coupling a pair of connectors of the connector apparatus of FIG. 6.
Figure 7B:
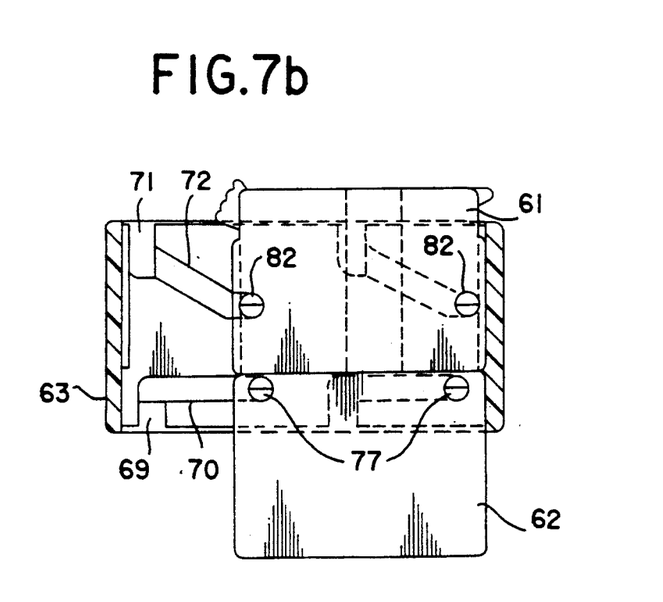

The main portion 67 of the fixing frame member 63 fitted in the rectangular hole 64 of the panel 65 extends in a perpendicular direction to the mounting flanges 66 and has a rectangular through-hole 68 formed therein. Referring also to FIGS. 7a and 7b, the main portion 67 has a pair of guideways or introducing grooves 69 and contiguous connector guiding supporting slots 70 and another pair of guideways or introducing grooves 71 and contiguous connector guiding supporting slots 72 formed on the inner side of each of an opposing pair of side walls 73 thereof. The introducing grooves 69 and 71 and connector guiding supporting slots 70 and 72 have substantially similar configurations to those of the introducing grooves 27 and 29 and connector guiding supporting grooves 28 and 30, respectively, except that the connector guiding supporting slots 70 and 72 extend through the side walls 73.

The passive connector 62 has a plurality of terminal accommodating chambers 74 formed therein and has a male-type terminal metal member 75 received in each of the terminal accommodating chambers 74 such that it partially extends outwardly from the passive connector 62 in a connector fitting direction in which the active and passive connectors 61 and 62 are to be fitted with or removed from each other, that is, in a vertical direction in FIG. 6. The passive connector 62 further has a pair of engaging rods 76a and 76b mounted thereon such that they extend outwardly in the connector fitting direction. The engaging rod 76b is generally of planar form extending laterally between the side walls 73 of the fixing frame and the guiding slots 70. A pair of engaging pins 77 are provided on each of a pair of opposing side faces 78 of the passive connector 62.

The active connector 61 has a plurality of terminal accommodating chambers 79 formed therein and has a female terminal metal member 80 received in each of the terminal accommodating chambers 79. The active connector 61 further has a rectangular engaging through-hole 81a and an engaging groove 81b formed at the center and on a side wall thereof for receiving the engaging rods 76a and 76b of the passive connector 62 therein, respectively. A pair of engaging pins 82 are provided on each of a pair of opposing side faces 83 of the active connector 61.

The active and passive connectors 61 and 62 have a substantially equal width to an inner dimension of the through-hole 68 of the fixing frame member 63 between the side walls 73.

The connector apparatus of the present embodiment is fixed to the panel 65 in a similar manner to the connector apparatus of the preceding embodiment shown in FIGS. 1 to 5. In the fixing process, the active and passive connectors 61 and 62 are assembled to the fixing frame member 63 in the following manner.

In particular, the passive connector 62 is first inserted from below in FIG. 7a into the rectangular through-hole 68 of the fixing frame member 63 until the the engaging pins 34 thereof come to the top ends in FIG. 7a of the introducing grooves 69 of the fixing frame member 73. Then, the active connector 61 is inserted from above in FIG. 7a into the rectangular through-hole 68 of the fixing frame member 63 until the engaging pins 82 thereof come to the bottom ends in FIG. 7a of the introducing grooves 71 of the fixing frame member 73 as seen in FIG. 7a. Thereupon, the engaging rods 76a and 76b of the passive connector 62 are inserted into the engaging through-holes 81a and 81b of the active connector 61.

Figure 8:
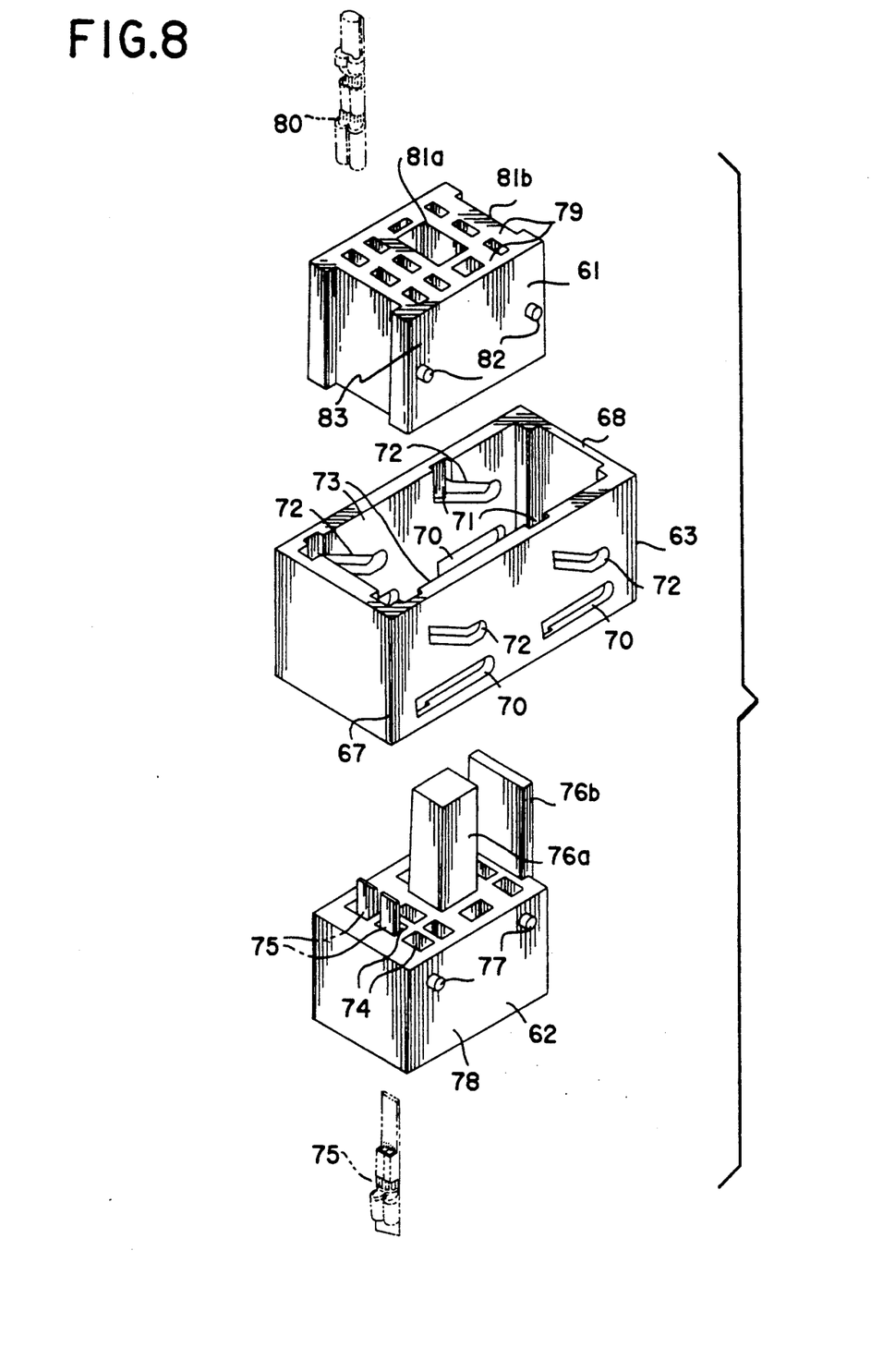
FIG. 8 is a fragmentary perspective view of a further connector apparatus showing a modification to the connector apparatus of FIG. 6.

Subsequently, the active connector 61 is manually operated to move in the rightward direction in FIG. 7a together with the passive connector 62. Upon such rightward movement, the engaging pins 82 of the active connector 61 are guided by the oblique guiding supporting slots 72 so that the active connector 61 is moved also downwardly in FIG. 7a toward the passive connector 62. Consequently, when the active connector 61 is moved to its rightward limit position defined by terminal ends of the guiding supporting slots 70 and 72 as seen in FIG. 7b, the female and male terminal metal members 80 and 75 are mated fully with each other to establish thorough fitting of the active and passive connectors 61 and 62 with each other.

Where the connector apparatus need not be secured when it is used, such mounting flanges 66 of the fixing frame member 63 as described above may be omitted as shown in FIG. 8.

Having now fully described the invention, it will be apparent to one of ordinary skill in the art that many changes and modifications can be made thereto without departing from the spirit and scope of the invention as set forth herein.

What is claimed is:

1. A connector apparatus comprising first and second connectors which are coupled to each other when moved toward each other, a fixing frame having a rectangular through-hole formed therein for receiving said first and second connectors for movement therein, said through-hole being defined by a pair of opposing side walls of said fixing frame along which said first and second connectors are movable in a first direction in which said first and second connectors are fitted with or removed from each other and in a second direction perpendicular to the first direction, said first and second connectors having a width substantially equal to an inner dimension of said through-hole between said pair of opposing side walls, one of said first and second connectors having an engaging rod while the other has an engaging recess formed thereon for engaging with said engaging rod, and guiding means for guiding said first and second connectors when said first connector is moved in the second direction together with said second connector after said first and second connectors are inserted into said through-hole of said fixing frame from the opposite ends in the first direction toward each other until said engaging rod is engaged with said engaging recess, said guiding means including a pair of pins provided on each of a pair of opposing side faces of each of said first and second connectors, first and second pairs of guideways formed on each of inner faces of said side walls of said fixing frame for cooperating with said pins of said first and second connectors, a first pair of guideways on each of said faces of said side walls of said fixing frame extending in an inclined relationship to said second direction, a second pair of guideways on each of said side walls of said fixing frame extending in said second direction, each of said first and second guideways extends to one of the opposite ends of said rectangular through-hole of said fixing frame in said first direction by an introducing groove which extends in said first direction, said pins are guided by said introducing grooves when said first and second connectors are first inserted into said through-hole of said fixing frame from opposite ends and moved toward each other until said engaging rod portion is engaged with said engaging recess, and said pins are then guided by said first and second pair of guideways, whereby said first and second connectors are caused to gradually approach and fit with each other.

* * * * *